(12) United States Patent
Park et al.

(10) Patent No.: US 11,275,276 B2
(45) Date of Patent: Mar. 15, 2022

(54) DISPLAY PANEL, METHOD OF MANUFACTURING DISPLAY PANEL, AND DISPLAY DEVICE INCLUDING DISPLAY PANEL

(71) Applicant: Samsung Display Co., Ltd., Yongin-si (KR)

(72) Inventors: Keunwoo Park, Incheon (KR); Yeogeon Yoon, Suwon-si (KR); Hee-keun Lee, Suwon-si (KR); Taejin Kong, Suwon-si (KR); Wontae Kim, Suwon-si (KR); Seok-joon Hong, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 39 days.

(21) Appl. No.: 16/268,921

(22) Filed: Feb. 6, 2019

(65) Prior Publication Data

US 2019/0243200 A1 Aug. 8, 2019

(30) Foreign Application Priority Data

Feb. 7, 2018 (KR) .......................... 10-2018-0015080

(51) Int. Cl.
*G02F 1/1339* (2006.01)
*G02F 1/1343* (2006.01)
(Continued)

(52) U.S. Cl.
CPC ...... *G02F 1/1339* (2013.01); *G02F 1/134309* (2013.01); *G02F 1/01791* (2021.01);
(Continued)

(58) Field of Classification Search
CPC ............ G02F 1/1339; G02F 1/134309; G02F 1/13398; G02F 1/133614; G02F 1/136222;
(Continued)

(56) References Cited

U.S. PATENT DOCUMENTS 7,750,984 B2 7/2010 Ha et al.
7,915,614 B2 3/2011 Shin et al.
(Continued)

FOREIGN PATENT DOCUMENTS

KR 10-1377456 3/2014
KR 10-1552902 9/2015
(Continued)

*Primary Examiner* — Nathanael R Briggs
(74) *Attorney, Agent, or Firm* — H.C. Park & Associates, PLC

(57) ABSTRACT

A display device includes a display panel and a light source configured to provide a first color light to the display panel. The display panel includes a first display substrate (DS), a second DS facing the first DS, a column spacer disposed between the first and second DSs, and a liquid crystal layer filled between the first and second DSs. The first DS includes: a first base substrate (FBS); a thin film transistor (TFT) disposed on the FBS, the TFT including a gate electrode, first and second electrodes, and an activation layer; a first insulation layer (IL) covering the TFT and disposed on the FBS; and a second IL disposed on the first IL and including an opening exposing a first portion of the first IL overlapping the activation layer. The column spacer is disposed on the first portion to cover the activation layer and shield the first color light.

20 Claims, 15 Drawing Sheets

(51) Int. Cl.
  *G02F 1/1335* (2006.01)
  *G02F 1/1362* (2006.01)
  *G02F 1/017* (2006.01)

(52) U.S. Cl.
  CPC .... *G02F 1/13398* (2021.01); *G02F 1/133504* (2013.01); *G02F 1/133514* (2013.01); *G02F 1/133614* (2021.01); *G02F 1/136209* (2013.01); *G02F 1/136222* (2021.01); *G02F 1/136227* (2013.01)

(58) Field of Classification Search
  CPC ........... G02F 1/01791; G02F 1/133504; G02F 1/133514; G02F 1/136209; G02F 1/136227
  See application file for complete search history.

(56) References Cited

U.S. PATENT DOCUMENTS

| | | | |
|---|---|---|---|
| 9,910,320 | B2 | 3/2018 | Kwak |
| 2001/0026347 | A1* | 10/2001 | Sawasaki .......... G02F 1/133707 349/156 |
| 2008/0192346 | A1 | 8/2008 | Kim et al. |
| 2010/0118236 | A1* | 5/2010 | Kim ................... G02F 1/133512 349/106 |
| 2013/0009176 | A1* | 1/2013 | Kang .................. G02F 1/13394 257/88 |
| 2013/0222723 | A1* | 8/2013 | Kim ........................ H01L 33/58 349/40 |
| 2013/0242228 | A1 | 9/2013 | Park et al. |
| 2015/0002774 | A1* | 1/2015 | Choi ..................... G02F 1/1368 349/43 |
| 2015/0103296 | A1* | 4/2015 | Kwak ............... G02F 1/134309 349/106 |
| 2015/0285969 | A1* | 10/2015 | Kim ........................ G02B 5/201 359/891 |
| 2015/0370116 | A1 | 12/2015 | Chae et al. |
| 2016/0313600 | A1* | 10/2016 | Park ................... G02F 1/133377 |
| 2016/0357042 | A1* | 12/2016 | Yoon ..................... G02F 1/1339 |
| 2017/0038629 | A1* | 2/2017 | Joo ..................... G02F 1/13394 |
| 2017/0102591 | A1 | 4/2017 | Huh et al. |
| 2017/0184900 | A1* | 6/2017 | Jang ................ G02F 1/133512 |
| 2017/0351149 | A1* | 12/2017 | Chu ..................... G02F 1/1368 |
| 2018/0335660 | A1* | 11/2018 | Wang ................ G02F 1/133305 |

FOREIGN PATENT DOCUMENTS

| | | |
|---|---|---|
| KR | 10-2017-0041929 | 4/2017 |
| KR | 10-2017-0082696 | 7/2017 |

* cited by examiner

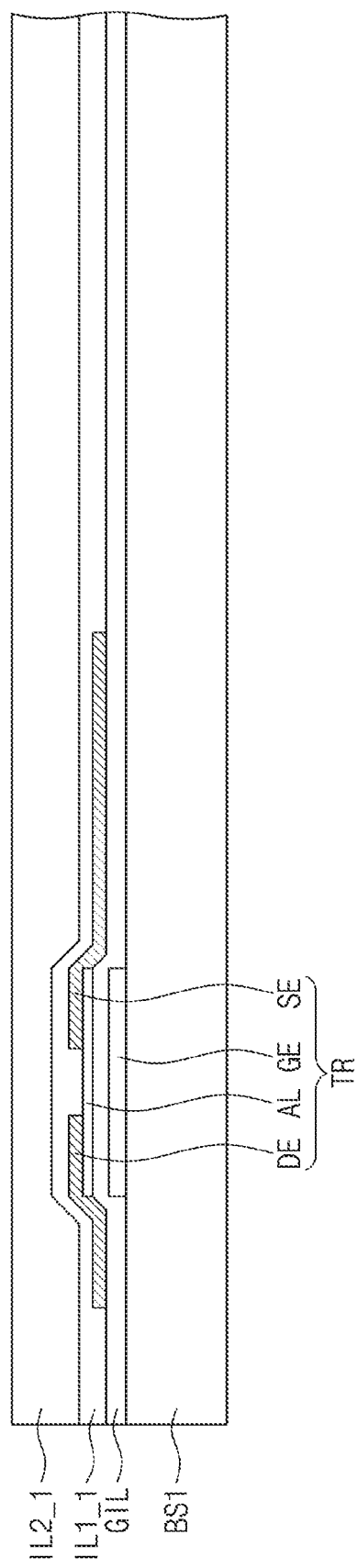

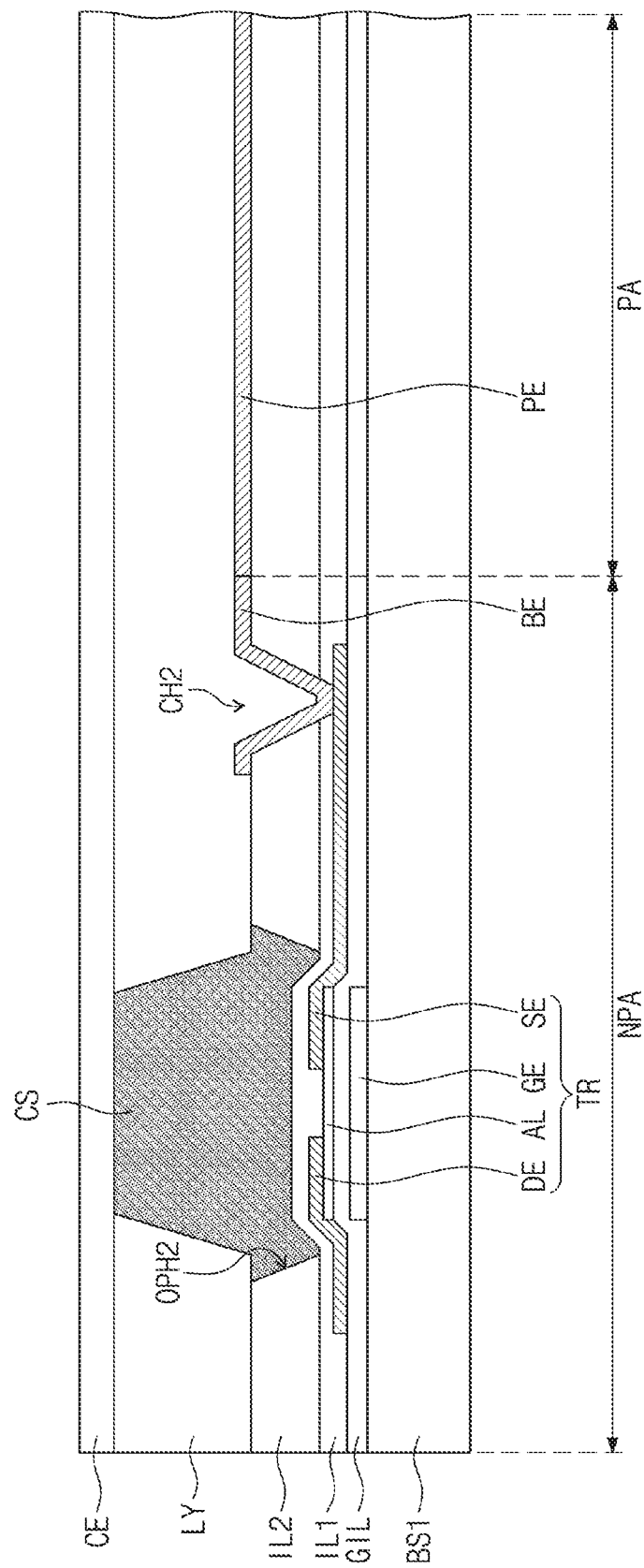

DISPLAY PANEL, METHOD OF MANUFACTURING DISPLAY PANEL, AND DISPLAY DEVICE INCLUDING DISPLAY PANEL

CROSS-REFERENCE TO RELATED APPLICATION

This application claims priority from and the benefit of Korean Patent Application No. 10-2018-0015080, filed Feb. 7, 2018, which is hereby incorporated by reference for all purposes as if fully set forth herein.

BACKGROUND

Field

One or more exemplary embodiments generally relate to a display device, and more particularly, to a display panel, a method of manufacturing the display panel, and a display device including the display panel.

Discussion

The display field has rapidly developed in line with the information age, and in response to this, various display devices having advantages, such as thinning, lightening, and low power consumption, have been developed. For example, because of excellent contrast in moving image display and high contrast ratio, liquid crystal display devices are actively used in association with notebook computers, monitors, and televisions. A liquid crystal display device typically includes a liquid crystal display panel and a light source, and the liquid crystal display panel may display an image based on light output from a light source.

The above information disclosed in this section is only for understanding the background of the inventive concepts, and, therefore, may contain information that does not form prior art.

SUMMARY

Some exemplary embodiments provide a display panel capable of preventing or at least reducing the amount of damage to a thin film transistor disposed on the display panel by light output from a light source.

Some exemplary embodiments provide a method of manufacturing a display panel capable of preventing or at least reducing the amount of damage to a thin film transistor disposed on the display panel by light output from a light source.

Some exemplary embodiments provide a display device including a display panel capable of preventing or at least reducing the amount of damage to a thin film transistor disposed on the display panel by light output from a light source.

Additional aspects will be set forth in the detailed description which follows, and, in part, will be apparent from the disclosure, or may be learned by practice of the inventive concepts.

According to some exemplary embodiments, a display device includes a display panel and a light source. The display panel includes a first display substrate, a second display substrate facing the first display substrate, a column spacer disposed between the first display substrate and the second display substrate, and a liquid crystal layer filled between the first display substrate and the second display substrate. The light source is configured to provide a first color light to the display panel. The first display substrate includes: a first base substrate; a thin film transistor disposed on the first base substrate, the thin film transistor including a gate electrode, first and second electrodes, and an activation layer; a first insulation layer covering the thin film transistor and disposed on the first base substrate; and a second insulation layer disposed on the first insulation layer, the second insulation layer including an opening exposing a first portion of the first insulation layer overlapping the activation layer. The column spacer is disposed on the first portion to cover the activation layer and shield the first color light.

In some exemplary embodiments, the column spacer may include a polymer resin, and a pigment or a dye dispersed in the polymer resin, the pigment or the dye being configured to shield the first color light.

In some exemplary embodiments, a color of the pigment or the dye may be orange, yellow, or red.

In some exemplary embodiments, the column spacer may include a first spacer portion disposed in the opening and providing a flat surface with the second insulation layer, and a second spacer portion extending from the first spacer portion toward a direction of the second display substrate.

In some exemplary embodiments, the first display substrate may further include: a connection electrode connected to one electrode among the first electrode and the second electrode of the thin film transistor, the connection electrode being disposed in a contact hole exposing a portion of the one electrode, the contact hole penetrating the first insulation layer and the second insulation layer; and a pixel electrode disposed on the second insulation layer and connected to the connection electrode.

In some exemplary embodiments, the opening may further expose a second portion of the first insulation layer overlapping the first electrode and the second electrode of the thin film transistor.

In some exemplary embodiments, the column spacer may include a first spacer portion disposed in the opening and providing a flat surface with the second insulation layer, and a second spacer portion overlapping the activation layer and disposed on the first spacer portion.

In some exemplary embodiments, the first spacer portion may include a polymer resin, and a first pigment or a first dye dispersed in the polymer resin, the first pigment or the first dye being configured to shield the first color light. The second spacer portion may include the polymer resin, and a second pigment or a second dye dispersed in the polymer resin, the second pigment or the second dye being configured to shield the first color light. The first pigment or the first dye may have a different color than the second pigment or the second dye.

In some exemplary embodiments, the second display substrate may include: a second base substrate; a conversion layer disposed on the second base substrate, the conversion layer being configured to absorb the first color light and emit a second color light; and a common electrode disposed on the conversion layer and supported by the column spacer.

In some exemplary embodiments, the conversion layer may include a first conversion unit including a first light emitter configured to absorb the first color light and emit is the second color light, a second conversion unit including a second light emitter configured to absorb the first color light and emit a third color light, and a third conversion unit configured to transmit the first color light.

In some exemplary embodiments, the first display substrate may further include an insulation layer covering the gate electrode and disposed on the first base substrate, the activation layer may overlap the gate electrode and may be disposed on the insulation layer, and the first electrode and the second electrode of the thin film transistor may be spaced apart from each other and may contact the activation layer.

According to some exemplary embodiments, a display panel includes a first display substrate, a second display substrate facing the first display substrate, and a column spacer disposed between the first display substrate and the second display substrate. The first display substrate includes: a first base substrate; a thin film transistor disposed on the first base substrate, the thin film transistor including a gate electrode, a first electrode, a second electrode, and an activation layer; a first insulation layer covering the thin film transistor and disposed on the first base substrate; a second insulation layer disposed on the first insulation layer, the second insulation layer including an opening exposing a first portion of the first insulation layer overlapping the activation layer. The column spacer is disposed on the first portion to cover the activation layer and to shield a first color light having a determined wavelength range.

In some exemplary embodiments, the first color light may be blue light.

In some exemplary embodiments, the column spacer may include a polymer resin, and a pigment or dye dispersed in the polymer resin configured to shield the first color of light.

In some exemplary embodiments, the second display substrate may include: a second base substrate; a conversion layer disposed on the second base substrate, the conversion layer being configured to absorb the first color light and emit a second color light; and a common electrode disposed on the conversion layer and supported by the column spacer. In a thickness direction of the first display substrate, a height of the column spacer may be greater than an interval between the second insulation layer and the common electrode.

According to some exemplary embodiments, a method of manufacturing a display panel includes: forming, on a first base substrate, a thin film transistor including a gate electrode, a first electrode, a second electrode, and an activation layer; forming, on the first base substrate, a first insulation layer covering the thin film transistor; forming a second insulation layer on the first insulation layer; forming an opening in the second insulation layer, the opening exposing a first portion of the first insulation layer overlapping the activation layer; forming a column spacer on the first portion covering the activation layer; disposing a second base substrate over the first base substrate, the second base substrate being supported by the column spacer and facing the first base substrate. The column spacer is configured to shield a first color light having a determined wavelength range.

In some exemplary embodiments, the method of manufacturing a display panel may further include exposing a second portion of the first insulation layer overlapping the first electrode and the second electrode of the thin film transistor.

In some exemplary embodiments, forming the column spacer may include: forming, in the opening, a first spacer portion such that the first spacer portion forms a flat surface with the second insulation layer; and forming a second spacer portion on the first space portion. The second spacer portion may overlap the activation layer.

In some exemplary embodiments, forming the opening in the second insulation layer may include: removing, via a mask, a portion of the second insulation layer overlapping the activation layer; and removing, via dry etching, a remaining portion of the second insulation layer overlapping the activation layer to expose the first portion of the first insulation layer.

In some exemplary embodiments, the column spacer may be formed by mixing a polymer resin and a pigment or dye of a different color than the first color.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIGS. 9A to 9F show a display panel at various stages of manufacture according to some exemplary embodiments.

DETAILED DESCRIPTION OF THE ILLUSTRATED EMBODIMENTS

Figure 1A:
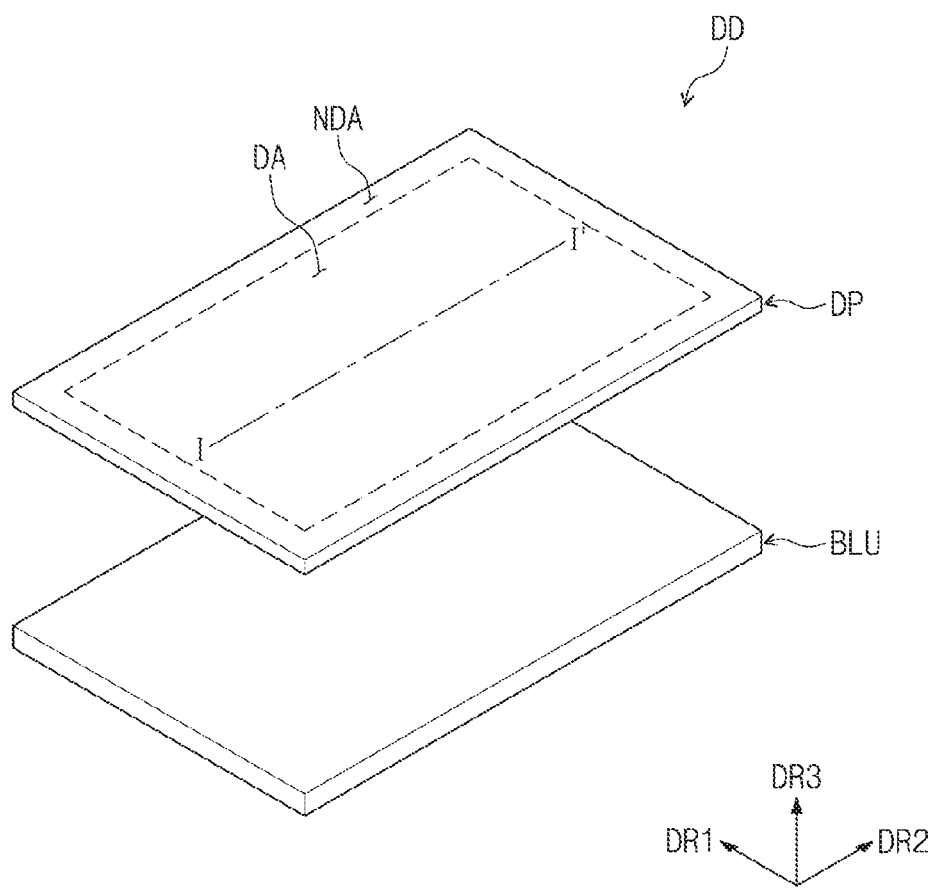
FIG. 1A is a perspective view of a display device according to some exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. In this manner, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Figure 1B:
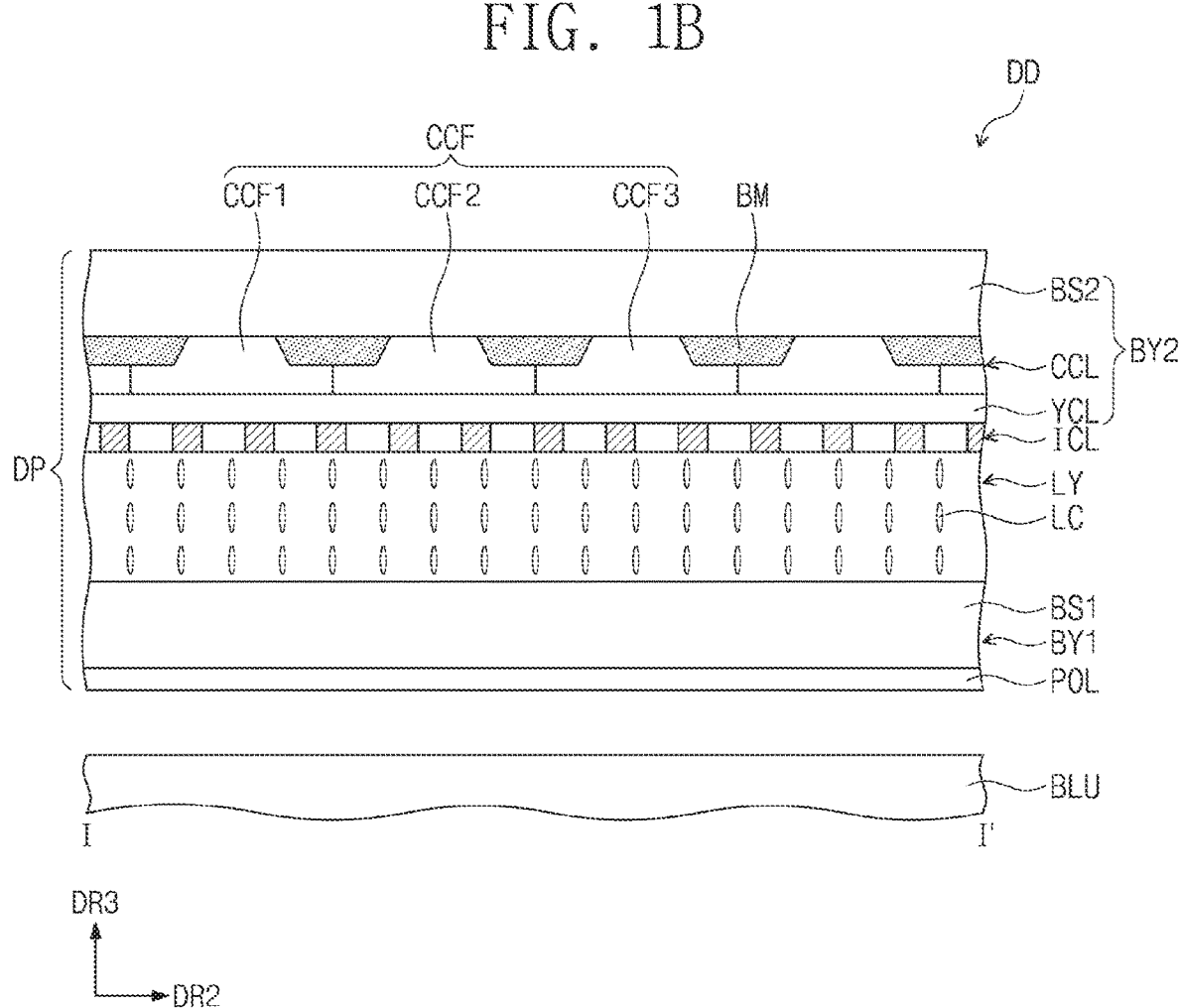
FIG. 1B is a cross-sectional view taken along sectional line I-I' of FIG. 1A according to some exemplary embodiments.

FIG. 1A is a perspective view of a display device according to some exemplary embodiments. FIG. 1B is a cross-sectional view taken along sectional line I-I' shown in FIG.

Figure 1C:
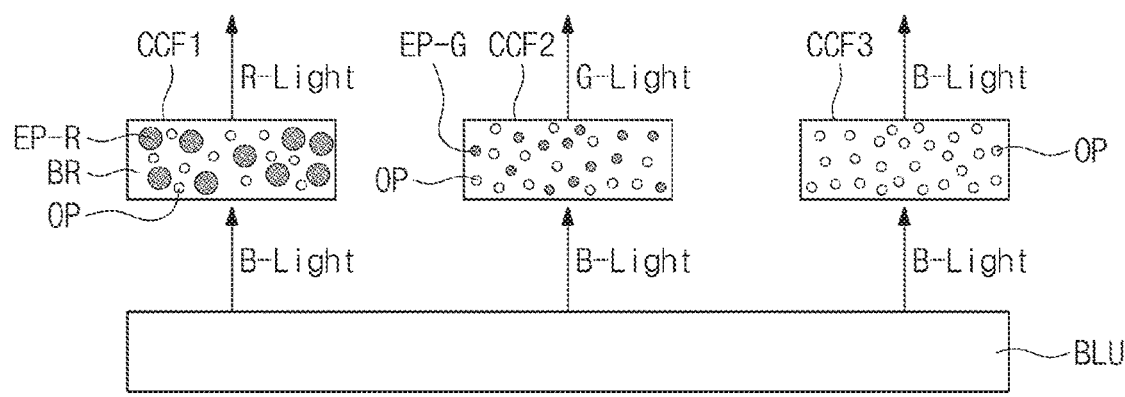
FIG. 1C is a view schematically illustrating optical characteristics of a conversion unit according to some exemplary embodiments.

1A according to some exemplary embodiments. FIG. 1C is a view schematically illustrating optical characteristics of a conversion unit according to some exemplary embodiments.

According to some exemplary embodiments, a display device, such as the display device DD shown in FIG. 1A) may be applied to a tablet personal computer (PC), a smart phone, a personal digital assistant (PDA), a portable multimedia player (PMP), a game machine, a wristwatch type device, an electronic device, and the like. In addition, the display device DD may be applied to large-sized electronic equipment, such as a large-sized television, an external billboard, etc., and small-sized electronic equipment, such as a PC, a notebook computer, a car navigation unit, a camera, etc.

Referring to FIG. 1A, the display device DD may include a display panel DP and a light source BLU that provides light to the display panel DP. The display panel DP may provide an image, and the light source BLU may generate a first color light.

The light source BLU may be disposed below the display panel DP to provide the first color light to the display panel DP. The first color light provided by the light source BLU may be blue light. Further, the first color light may be ultraviolet light. For example, the light source BLU may provide light in a wavelength range from 350 nm to 450 nm.

Although not shown, the light source BLU may include a plurality of light emitting elements. The light emitting elements may output blue light as the first color light. The light source BLU may include a plurality of light emitting elements and a circuit substrate (not shown) for supplying power to the plurality of light emitting elements. The light emitting elements may be disposed on a circuit substrate.

The first color light generated in (or by) the light source BLU may be provided to the display panel DP. The display panel DP may be disposed on the light source BLU. The display panel DP may include a display area DA for displaying an image and a non-display area NDA for not displaying an image. The non-display area NDA may be disposed adjacent to the display area DA. For example, the non-display area NDA may surround the display area DA.

According to some exemplary embodiments, the display panel DP may be provided as a panel of any one of an organic light emitting display panel, a liquid crystal display panel, a plasma display panel, an electrophoretic display panel, a microelectromechanical system (MEMS) display panel, an electrowetting display panel, and the like.

Hereinafter, for descriptive convenience, the display panel DP will be described as a liquid crystal display panel. The display panel DP may be classified into a twisted nematic liquid crystal display device, a horizontal electric field liquid crystal display device, or a vertically aligned liquid crystal display device depending on the characteristics of a liquid crystal layer. Among these classifications, the display panel DP may be provided as a vertical alignment type liquid crystal display panel in which while an electric field is not applied, a long axis of liquid crystal molecules oriented in a determined direction is aligned perpendicularly to a substrate surface.

Further, as seen in FIG. 1A, the display panel DP is parallel to a plane defined by the first direction DR1 and the second direction DR2. A normal direction of the display panel DP is indicated by the third direction DR3. The third direction DR3 indicates the thickness direction of the display panel DP. The upper surface (or front surface) and the lower surface (or back surface) of each of the members are divided (or spaced apart from one another) by the third direction DR3. However, the directions indicated by the first, second, and third directions DR1, DR2, DR3 may be converted to other directions as relative concepts.

For descriptive and illustrative convenience, the display device DD is shown and described as having a flat shape, but exemplary embodiments are not limited thereto. For instance, in one exemplary embodiment, the display device DD may be a curved display device. For example, the display device DD may be a generally concavely curved display device or a convexly curved display device when the user looks at the display device DD. Further, it may be a display device DD that is bended only at one portion of the display device DD. In addition, the display device DD may be a flexible display device. For example, the display device DD may be a foldable display device or a rollable display device.

The display area DA of the display panel DP may include a plurality of transmissive areas (not shown) and a plurality of non-transmissive areas.

FIG. 1B is a cross-sectional view of the display panel DP superimposed on the display area DA. Referring to FIG. 1B, the display device DD includes a first display substrate BY1, a second display substrate BY2, a liquid crystal layer LY, a polarizing layer POL, and an in-cell polarizing layer ICL. The liquid crystal layer LY is disposed between the first display substrate BY1 and the second display substrate BY2.

The first display substrate BY1 includes a first base substrate BS1 and the second display substrate BY2 includes a second base substrate BS2, a conversion layer CCL, and a light control layer YCL. The configuration included in the first display substrate BY1 and the second display substrate BY2 will be described with reference to FIG. 1B, but exemplary embodiments are not limited thereto. That is, the first display substrate BY1 and the second display substrate BY2 may additionally or alternatively include other configurations.

The display panel DP may include a first base substrate BS1, a second base substrate BS2, and a liquid crystal layer LY, which are opposed to each other. The liquid crystal layer LY may be disposed between the first base substrate BS1 and the second base substrate BS2. Hereinafter, the term "overlap" is described as meaning that specified elements overlap in the third direction DR3, which is the thickness direction of the display panel DP.

The first base substrate BS1 and the second base substrate BS2 may independently be a polymer substrate, a plastic substrate, a glass substrate, a quartz substrate, and/or the like. The first base substrate BS1 and the second base substrate BS2 may be a transparent insulating substrate. The first base substrate BS1 and the second base substrate BS2 may be rigid. The first base substrate BS1 and the second base substrate BS2 may be flexible. Although not shown in the drawings, the first base substrate BS1 and the second base substrate BS2 may each include a common electrode and a pixel electrode. In some exemplary embodiments, the first base substrate BS1 and the second base substrate BS2 may include at least one of the common electrode and the pixel electrode. It is also contemplated that the common electrode and the pixel electrode may be disposed on at least one of the first base substrate BS1 and the second base substrate BS2.

A pixel electrode PE (see FIG. 7A) may be disposed on the upper surface of the first base substrate BS1. A common electrode (see FIG. 7A) may be disposed on the lower surface of the second base substrate BS2. Here, the upper surface of the first base substrate BS1 may be one surface adjacent to the liquid crystal layer LY and facing the second base substrate BS2, and the lower surface of the second base substrate BS2 may be one surface adjacent to the liquid crystal layer LY and facing the first base substrate BS1.

The liquid crystal layer LY is disposed between the first base substrate BS1 and the second base substrate BS2 and includes a plurality of liquid crystal molecules LC. The liquid crystal layer LY may be provided by arranging liquid crystal molecules LC having a dielectric anisotropy. The liquid crystal layer LY is not particularly limited as long as it is a commonly used liquid crystal molecule. For example, as the liquid crystal molecule LC, an alkenyl-based liquid crystal compound or an alkoxy-based liquid crystal compound may be used. The liquid crystal molecules LC used in some exemplary embodiments may have negative dielectric anisotropy, but exemplary embodiments are not limited thereto. For example, a liquid crystal molecule LC having a positive dielectric anisotropy may be used.

A conversion layer CCL may be disposed between the liquid crystal layer LY and the second base substrate BS2. The conversion layer CCL may be disposed on the second base substrate BS2. The conversion layer CCL may include a light emitter that absorbs the first color light provided by the light source BLU and emits a color light in a different color from the first color. For instance, referring to FIG. 1C, the conversion layer CCL may include one or more conversion units CCF, such as a first conversion unit CCF1 including a first light emitter EP-R, a second conversion unit CCF2 including a second light emitter EP-G, and a third conversion unit CCF3 that transmits light.

For example, the first light emitter EP-R may emit red light by absorbing the first color light that is blue light B-Light, and the second light emitter EP-G may emit green light by absorbing the first color light that is blue light B-Light. Hereinafter, the red light is described as the second color light, and the green light is described as the third color light. That is, the first conversion unit CCF1 may be a light emitting area for emitting red light and the second conversion unit CCF2 may a second light emitting area for emitting green light. Also, the third conversion unit CCF3 may be a portion that does not include a light emitter. That is, the third conversion unit CCF3 may be a light emitting area that emits blue light, e.g., blue light B-Light.

The first to third conversion units CCF1, CCF2, and CCF3 may include a base resin BR. The base resin BR may be a polymer resin. For example, the base resin BR may be an acrylic resin, a urethane resin, a silicone resin, an epoxy resin, and/or the like. The base resin BR may be a transparent resin.

In addition, the first to third conversion units CCF1, CCF2, and CCF3 may further include scattering particles OP. The scattering particles OP may be $TiO_2$ or silica-based nanoparticles; however, exemplary embodiments are not limited thereto. The scattering particles OP may scatter the light emitted by the light emitter and emit it out of the conversion unit. Further, when the light provided via the third conversion unit CCF3 is transmitted as it is, the scattering particles OP may scatter the provided light and emit it to the outside.

The first and second light emitters EP-R and EP-G (hereinafter referred to as light emitters) included in the conversion layer CCL may be a phosphor or a quantum dot. That is, in some exemplary embodiments, the conversion layer CCL may include at least one of phosphor or quantum dot as light emitters EP-R and EP-G. For example, a phosphor used in light emitters EP-R and EP-G may be an inorganic phosphor. The phosphor used as the light emitters EP-R and EP-G in the display device DD of some exemplary embodiments may be a green phosphor or a red phosphor.

The green phosphor may be any one selected from the group consisting of $YBO_3:Ce_3^+$, $Tb_3^+$, $BaMgAl_{10}O_{17}:Eu_2^+$, $Mn_2^+$, $(Sr,Ca,Ba)(Al,Ga)_2S_4:Eu_2^+$; $ZnS:Cu,Al$, $Ca_8Mg(SiO_4)_4Cl_2:Eu_2^+$, $Mn_2^+$; $Ba_2SiO_4:Eu_2^+$; $(Ba,Sr)_2SiO_4:Eu_2^+$; $Ba_2(Mg,Zn)Si_2O_7:Eu_2^+$; $(Ba,Sr)Al_2O_4:Eu_2^+$, $Sr_2Si_3O_8.2SrCl_2:Eu_2^+$. The red phosphor may be any one selected from the group consisting of $(Sr,Ca,Ba,Mg)P_2O_7:Eu_2+$, $Mn_2+$, $CaLa_2S_4:Ce_3+$; $SrY_2S_4:Eu_2^+$, $(Ca,Sr)S:Eu_2^+$, $SrS:Eu_2+$, $Y_2O_3:Eu_3+$, $Bi_3+$; $YVO_4:Eu_3+$, $Bi_3+$; $Y_2O_2S:Eu_3+$, $Bi_3+$; $Y_2O_2S:Eu_3^+$. It is contemplated, however, that the type of phosphor used in the conversion layer CCL of various exemplary embodiments is not limited to the aforementioned materials. In other words, any suitable known phosphor material may be used.

As another example, the light emitters EP-R and EP-G included in the conversion layer CCL may be quantum dots. The quantum dot may be selected from Group II-VI compounds, Group III-V compounds, Group IV-VI compounds, Group IV elements, Group IV compounds, and combinations thereof.

The Group II-VI compound may be selected from bivalent element compounds selected from the group consisting of CdsBe, CdTe, ZnS, ZnSe, ZnTe, ZnO, HgS, HgSe, HgTe, MgSe, MgS, and compounds thereof; trivalent element compounds selected from the group consisting of CdSBeS, CdsBeTe, CdsBTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and compounds thereof; and tetravalent element compounds selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and compounds thereof.

The Group III-V compound may be selected from bivalent element compounds selected from the group consisting of GaN, GaP, GaAs, GaSb, AN, AlP, AlAs, AlSb, InN, InP, InAs, InSb, and compounds thereof; trivalent element compounds selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and compounds thereof; and tetravalent element compounds selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and compounds thereof. The Group IV-VI compound may be selected from bivalent element compounds selected from the group consisting of SnS, SnSe, SnTe, PbS, PbSe, PbTe, and compounds thereof; trivalent element compounds selected from the group consisting of SnSeS, SnSeTe, SnSTe, PbSeS, PbSeTe, PbSTe, SnPbS, SnPbSe, SnPbTe, and compounds thereof; and tetravalent element compounds selected from the group consisting of SnPbSSe, SnPbSeTe, SnPbSTe, and compounds thereof. The Group IV elements may be selected from the group consisting of Si, Ge, and compounds thereof. The IV group compound may be a bivalent element compound selected from the group consisting of SiC, SiGe, and compounds thereof.

According to various exemplary embodiments, the bivalent element compound, the trivalent element compound, or the tetravalent element compound may be present in the particle at a uniform concentration, or may be present in the same particle by dividing the concentration distribution into a partially different states. The quantum dot may be a core shell structure including a core and a shell surrounding the core. Also, one quantum dot may have a core/shell structure surrounding other quantum dots. The interface between the core and the shell may have a concentration gradient that is lowered as the concentration of the element in the shell approaches the center.

In some exemplary embodiments, the quantum dot may be a particle having a nanometer scale size. The quantum dot may have a full width at half maximum (FWHM) of the emission wavelength spectrum of about 45 nm or less, for instance about 40 nm or less, e.g., about 30 nm or less, and in this range, color purity and color reproducibility may be improved. Further, since light emitted through the quantum dots is emitted in all directions, a wide viewing angle may be improved.

The shape of the quantum dots is not particularly limited. For instance, the shape of the quantum dots may be in the form of spherical, pyramidal, multi-arm, or cubic nanoparticles, nanotubes, nanowires, nanofibers, nano platelike particles, and the like.

According to some exemplary embodiments, the quantum dot may change the color of light emitted according to the particle size. When the first light emitter EP-R and the second light emitter EP-G are quantum dots, the particle size of the first light emitter EP-R and the particle size of the second light emitter EP-G may be different from each other. For example, the particle size of the first light emitter EP-R may be smaller than the particle size of the second light emitter EP-G. Further, the first light emitter EP-R may emit light of a shorter wavelength than the second light emitter EP-G.

Referring again to FIG. 1B, a black matrix BM may be disposed between the conversion units disposed apart from each other. The black matrix BM may be implemented in black color and may be included in the conversion layer CCL. The black matrix BM may be formed by including an organic light-shielding material or an inorganic light-shielding material including a black pigment or a dye. The black matrix BM may prevent a light leakage phenomenon and may separate boundaries between adjacent conversion units.

A light control layer YCL may be disposed between the conversion layer CCL and the in-cell polarizing layer ICL. The light control layer YCL overlaps the display area DA and the non-display area NDA and may be disposed on the conversion layer CCL. The light control layer YCL may transmit the incident first color light and may partially absorb the incident second color light and third color light. On the other hand, the light control layer YCL may be disposed to overlap only the display area DA, or may be omitted according to some exemplary embodiments.

In addition, the display panel DP may include a polarizing layer POL and an in-cell polarizing layer ICL. The polarizing layer POL has a polarization axis in one direction, and the in-cell polarizing layer ICL may have a polarization axis in another direction, such as orthogonal to the one direction of the polarizing layer POL.

As shown in FIG. 1B, the polarizing layer POL may be disposed on the lower surface of the first base substrate BS1. The polarizing layer POL may transmit light oscillating in a direction parallel to the polarization axis of the one direction. The polarizing layer POL may be a coated polarizing layer or a polarizing layer formed by deposition. The polarizing layer POL may be formed by coating a substance including a dichroic dye and a liquid crystal compound.

The in-cell polarizing layer ICL may be disposed between the conversion layer CCL and the liquid crystal layer LY. The in-cell polarizing layer ICL may transmit light oscillating in the other direction orthogonal to the one direction. According to some exemplary embodiments, the in-cell polarizing layer ICL may be made of a metal material and may include at least one of aluminum (Al), silver (Ag), and molybdenum-titanium oxide (MTO).

According to some exemplary embodiments, the in-cell polarizing layer ICL may include a wire grid pattern overlapping the display area DA and the non-display area NDA. In another example, the in-cell polarizing layer ICL may overlap only the display area DA or only one area of the non-display area NDA. The wire grid pattern may transmit the light transmitted through the polarizing layer POL in the other direction orthogonal to the one direction.

Figure 2:
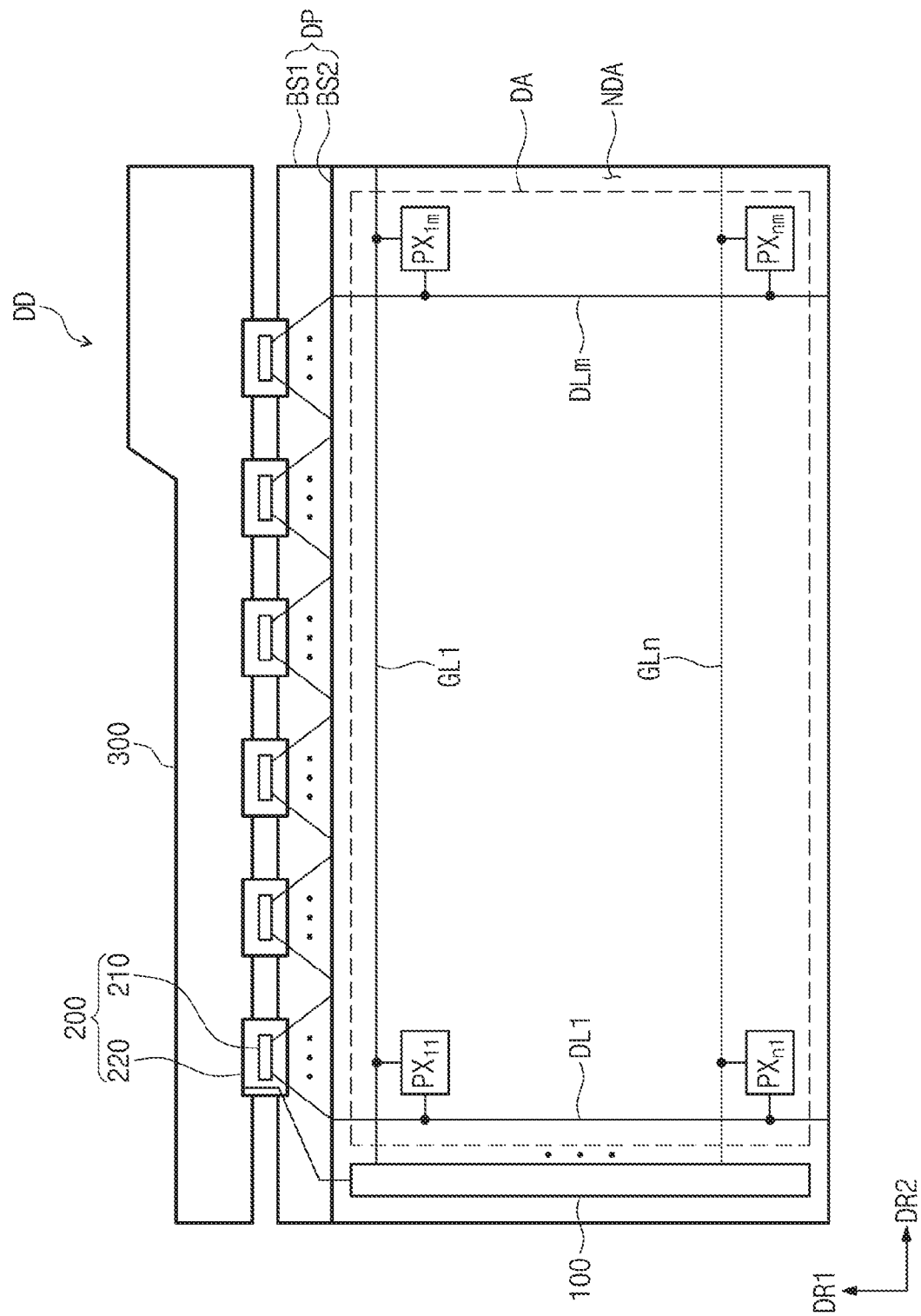
FIG. 2 is a block diagram illustrating a display device according to some exemplary embodiments.
Figure 3:
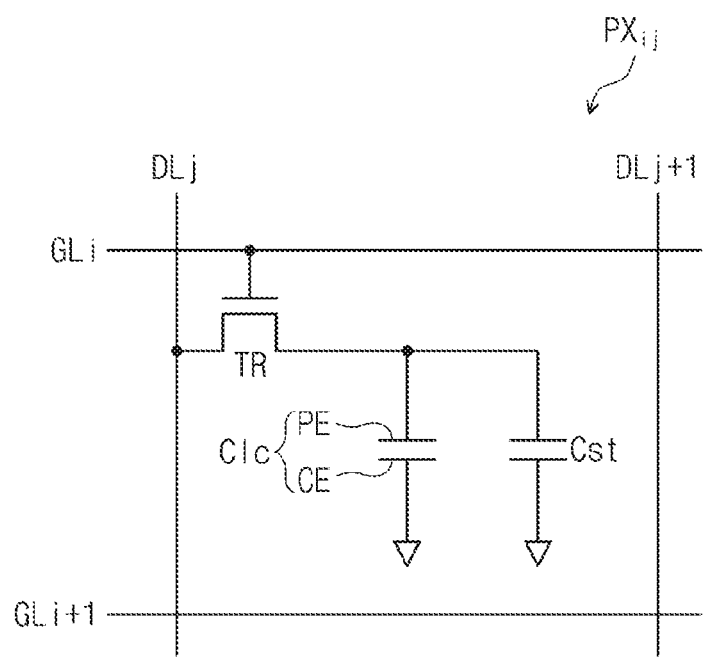
FIG. 3 is an equivalent circuit diagram of a pixel shown in FIG. 2 according to some exemplary embodiments.

FIG. 2 is a block diagram of a display device according to some exemplary embodiments. FIG. 3 is an equivalent circuit diagram of a pixel shown in FIG. 2 according to some exemplary embodiments.

Referring to FIG. 2, the display panel DP includes a display area DA formed with a plurality of pixels PX11 to PXnm, and a non-display area NDA surrounding the display area DA.

A plurality of gate lines GL1 to GLn and a plurality of data lines DL1 to DLm intersecting the gate lines GL1 to GLn are arranged on the first base substrate BS1. Only some of the plurality of gate lines GL1 to GLn and the plurality of data lines DL1 to DLm are illustrated in FIG. 2. The plurality of gate lines GL1 to GLn are connected to the gate driving circuit 100 to receive (e.g., sequentially receive) the gate signals. The plurality of data lines DL1 to DLm are connected to the data driving circuit 200 to receive data signals (or data voltages) in, for instance, analog form. The plurality of pixels PX11 to PXnm are respectively connected to corresponding gate lines among the plurality of gate lines GL1 to GLn and corresponding data lines among the plurality of data lines DL1 to DLm.

The gate driving circuit 100 and the pixels PX11 to PXnm may be formed simultaneously through a thin film process. For example, the gate driving circuit 100 may be integrated into (or as part of) the display panel DP through an oxide silicon gate driver circuit (OSG) or an amorphous silicon gate driver circuit (ASG) process in a non-display area NDA.

According to some exemplary embodiments, the gate driving circuit 100 is connected to the left ends of the plurality of gate lines GL1 to GLn, but this is only one illustrative example. The display device DD may include two gate driving circuits, and one of the two gate driving circuits may be connected to the left ends of the plurality of gate lines GL1 to GLn and the other one may be connected to the right ends of the plurality of gate lines GL1 to GLn. Additionally, one of the two gate driving circuits may be connected to odd gate lines and the other one may be connected to even gate lines.

The data driving circuit 200 receives data signals from a signal control unit (not shown) mounted on the circuit board 300 and generates analog data signals corresponding to data signals. The data driving circuit 200 includes a driving chip 210 and a flexible circuit substrate 220 mounting the driving chip 210. The driving chip 210 and the flexible circuit board 220 may be provided in plurality. The flexible circuit substrate 220 electrically connects the circuit substrate 300 and the first display substrate BY1. The plurality of driving chips 210 provide data signals to corresponding data lines, respectively.

In addition, FIG. 2 illustrates a data driving circuit 200 formed of a tape carrier package (TCP) as an example. However, the data driving circuit 200 may be mounted on the first display substrate BY1 through a chip-on-glass (COG) method or any other suitable method.

Each of the plurality of pixels PX11 to PXnm shown in FIG. 2 may have an equivalent circuit shown in FIG. 3. As shown in FIG. 3, the pixel PXij includes a thin film transistor TR, a liquid crystal capacitor Clc, and a storage capacitor Cst. The thin film transistor TR is electrically connected to an ith gate line GLi and a jth data line DLj. The thin film transistor TR outputs a data signal received from the jth data line DLj in response to the gate signal received from the ith gate line GLi.

The liquid crystal capacitor Clc includes a pixel electrode PE and a common electrode CE. The pixel electrode PE is electrically connected to the thin film transistor TR and receives a data voltage corresponding to a data signal output from the jth data line DLj. The common electrode CE receives a common voltage. Depending on a charge amount difference between the data voltage received at the pixel electrode PE and the common voltage received at the common electrode CE in the liquid crystal capacitor Clc, the arrangement of liquid crystal directors (not shown) included in the liquid crystal layer (not shown) is changed. According to the arrangement of the liquid crystal director, light incident on the liquid crystal layer is transmitted or blocked.

The storage capacitor Cst is connected in parallel with the liquid crystal capacitor Clc. The storage capacitor Cst maintains an arrangement of liquid crystal directors during a determined section.

On the other hand, as described above, the gate driving circuit 100 includes a transistor connected to the thin film transistor TR. The transistor included in the gate driving circuit 100 may be formed on the first base substrate BS1 together with the thin film transistor TR through the same thin film process. In this case, the transistors included in the gate driving circuit 100 may be formed on the first base substrate BS1 to overlap the non-display area NDA, and the thin film transistor TR may be formed on the first base substrate BS1 to overlap the display area DA.

Although not shown on the second base substrate BS2, a common electrode and the conversion layer CCL, the light control layer YCL, and the like described with reference to FIG. 1B may be disposed.

Figure 4:
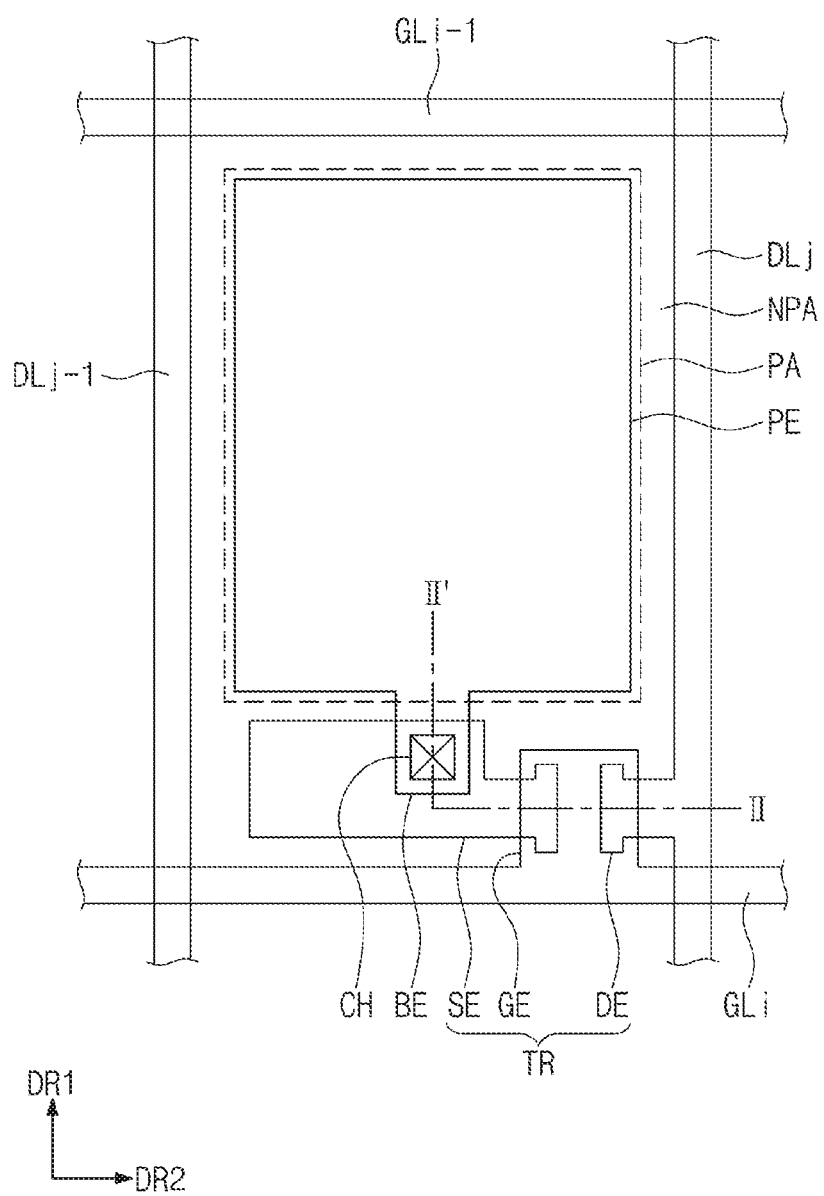
FIG. 4 is a plan view of a pixel shown in FIG. 2 according to some exemplary embodiments.
Figure 5:
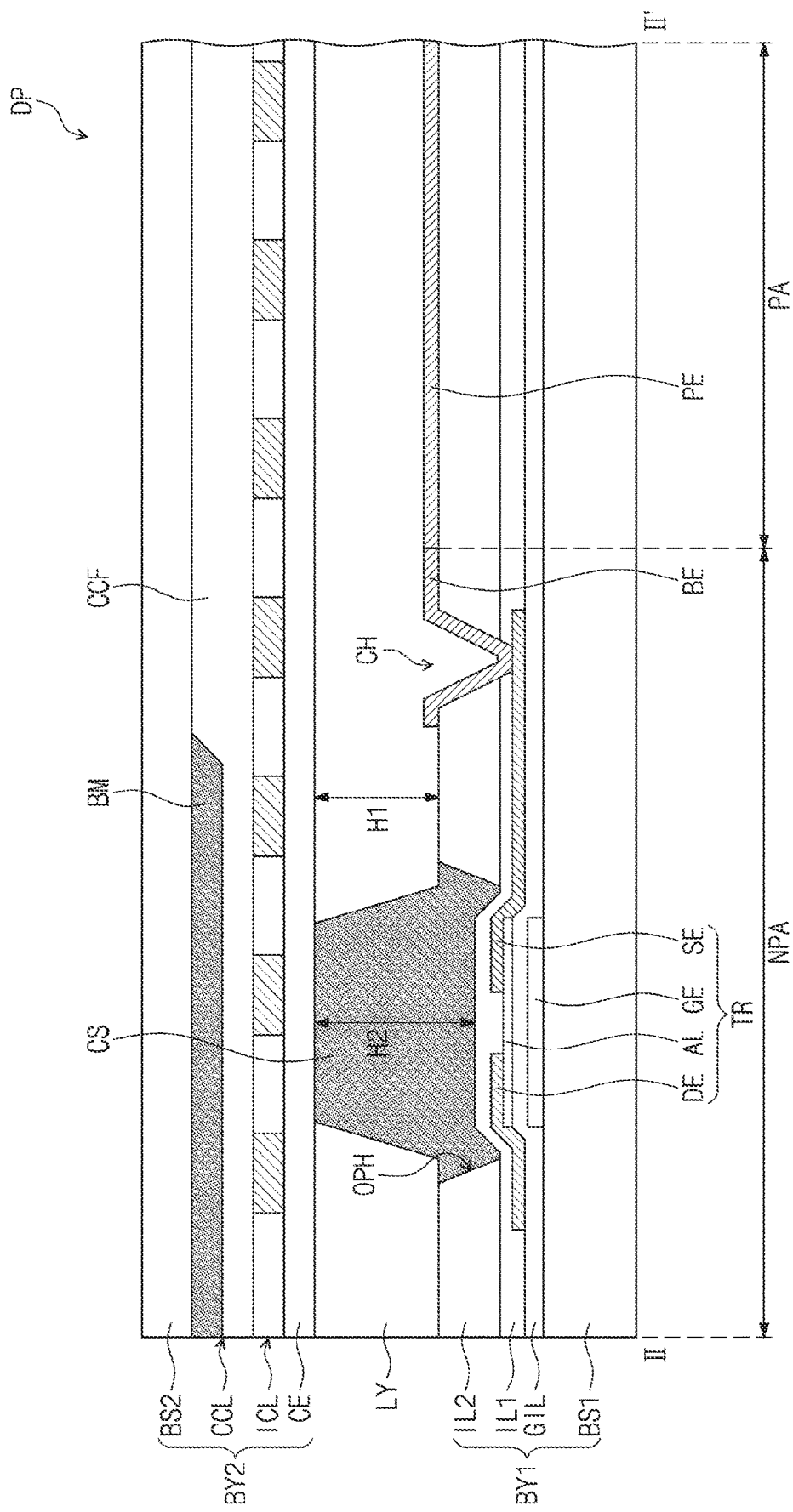
FIG. 5 is a cross-sectional view taken along sectional line II-II' shown in FIG. 4 according to some exemplary embodiments.
Figure 6:
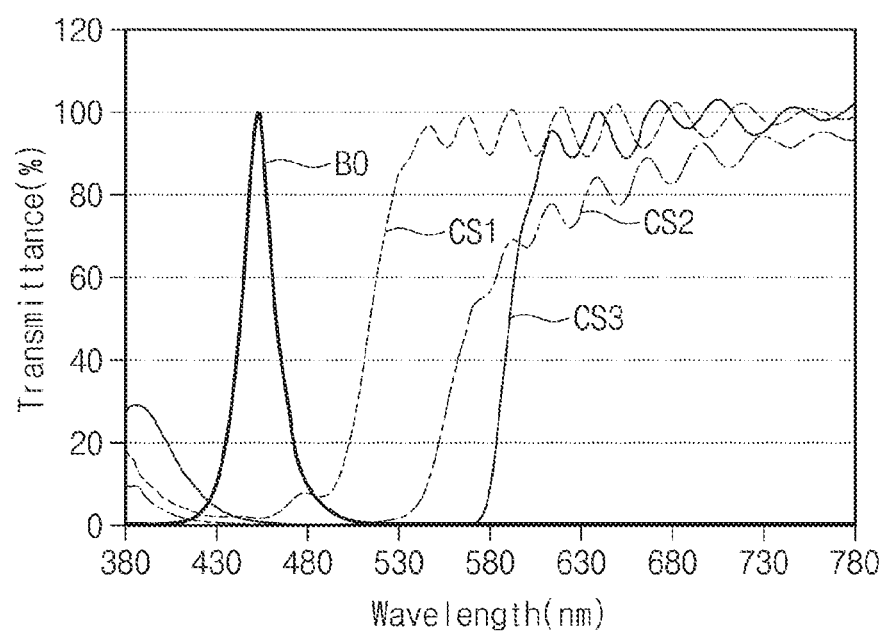
FIG. 6 is a graph showing spectra of various colors for shielding blue light according to some exemplary embodiments.

FIG. 4 is a plan view of a pixel shown in FIG. 2 according to some exemplary embodiments. FIG. 5 is a cross-sectional view taken along sectional line II-II' shown in FIG. 4 according to some exemplary embodiments. FIG. 6 is a graph showing spectra of various colors for shielding blue light according to some exemplary embodiments.

Referring to FIG. 4, the planar area of the pixel PXij includes a transmissive area PA and a non-transmissive area NPA outside, e.g., around, the transmissive area PA. The transmissive area PA may be defined as an area where light is output to the outside; that is, an area where an image is displayed. The non-transmissive area NPA may be defined as an area where light is not output to the outside; that is, an area where no image is displayed. The display area DA illustrated in FIG. 1A may include a transmissive area PA and a non-transmissive area NPA. It is also noted that a non-transmissive area NPA may be defined as an area between transmissive areas PA. Thus, substantially, the planar area of the pixels PX11 to PXnm includes transmissive areas PA corresponding to the pixels PX11 to PXnm and non-transmissive areas NPA between the transmissive areas PA.

The gate lines GLi-1 and GLi and the data lines DLj-1 and DLj are arranged in the non-transmissive area NPA. The gate lines GLi-1 and GLi extend in the second direction DR2. The data lines DLj-1 and DLj extend in a first direction DR1 intersecting the second direction DR2 and insulatingly intersect the gate lines GLi-1 and GLi, where "i" is an integer greater than zero (0) and less than or equal to n, and "j" is an integer greater than zero (0) and less than or equal to m.

The pixel PXij includes a thin film transistor TR and a pixel electrode PE connected to the thin film transistor TR. The thin film transistor TR is arranged in the non-transmissive area NPA. The pixel electrode PE is disposed in the transmissive area PA. The thin film transistor TR of the pixel PXij is connected to the corresponding gate line GLi and the corresponding data line DLj.

The thin film transistor TR includes a gate electrode GE branched from the gate line GLi, a drain electrode DE branched from the data line DLj, and a source electrode SE electrically connected to the pixel electrode PE. For instance, the source electrode SE is connected to the connection electrode BE through the contact hole CH.

The pixel electrode PE extends to the non-transmissive area NPA and is connected to the source electrode SE of the thin film transistor TR through the contact hole CH. As seen in FIG. 4, the connection electrode BE branched from the pixel electrode PE is connected to the source electrode SE of the thin film transistor TR through the contact hole CH. The connection electrode BE is disposed in a non-transmissive area NPA.

Referring to FIGS. 5 and 6, the display panel DP further includes a column spacer CS in addition to the first and second display substrates BY1 and BY2 and the liquid crystal layer LY described above.

The first display substrate BY1 includes a first base substrate BS1, a gate insulation layer GIL, a first insulation layer Ill, a second insulation layer IL2, a thin film transistor TR, a connection electrode BE, and a pixel electrode PE.

The first base substrate BS1 may be a polymer substrate, a plastic substrate, a glass substrate, or a quartz substrate. The first base substrate BS1 may be a transparent insulating substrate. The first base substrate BS1 may be rigid or flexible.

The thin film transistor TR includes a gate electrode GE, an activation layer AL overlapping the gate electrode GE, a drain electrode DE (or a first electrode) connected to the data line DL, and a source electrode SE (or a second electrode) spaced apart from the drain electrode DE. The thin film transistor TR may be disposed on the first base substrate BS1 so as to overlap the non-transmissive area NPA. That is, the gate electrode GE is disposed on the first base substrate BS1 in the non-transmissive area NPA. The gate insulation layer GIL covers the gate electrode GE and is disposed on the first base substrate BS1.

The activation layer AL, the drain electrode DE, and the source electrode SE are disposed on the gate insulation layer GIL. The activation layer AL overlaps the gate electrode GE and may include a semiconductor layer and an ohmic contact layer. The drain electrode DE and the source electrode SE may be disposed on the activation layer AL. Each of the drain electrode DE and the source electrode SE is overlapped with at least a portion of the activation layer AL.

The first insulation layer IL1 covers the thin film transistor TR and is disposed on the gate insulation layer GIL. A second insulation layer IL2 may be disposed on the first insulation layer IL1 to provide a planarization layer on the first insulation layer ILL A pixel electrode PE and a connection electrode BE branched from the pixel electrode PE may be disposed on the second insulation layer IL2. For instance, the connection electrode BE may be connected to the source electrode SE through a contact hole CH penetrating the first insulation layer IL1 and the second insulation layer IL2.

Although it is described that the source electrode SE is connected to the connection electrode BE, the positions of the source electrode SE and the drain electrode DE may be mutually changed. That is, according to some exemplary embodiments, the source electrode SE may be connected to the data line DL, and the drain electrode DE may be connected to the connection electrode BE.

According to some exemplary embodiments, the second insulation layer IL2 may include an opening OPH exposing the first insulation layer IL1 overlapping the activation layer AL. That is, on a plane (or in a plan view), the opening OPH may be superimposed over the activation layer AL and may be formed in the second insulation layer IL2 wider than the entire area of the activation layer AL. Hereinafter, the portion of the first insulation layer IL1 exposed to the outside by the opening OPH will be described as the first portion.

The column spacer CS may be disposed adjacent to each of the plurality of pixels to maintain a space between the first display substrate BY1 and the second display substrate BY2 in the third direction DR3. That is, the lower portion of the column spacer CS supports the first display substrate BY1 and the upper portion supports the second display substrate BY2.

According to some exemplary embodiments, the column spacer CS may be disposed on the first portion of the first insulation layer IL1 exposed to the outside by the opening OPH. The column spacer CS may cover the activation layer AL as a whole on the plane. For instance, the column spacer CS includes a first spacer portion disposed in the opening OPH and forming a flat surface with the second insulation layer IL2 and a second spacer portion extending from the first spacer portion toward the second display substrate BY2. The first spacer portion may be disposed directly on the first portion of the first insulation layer Ill, and the second spacer portion may be disposed in the liquid crystal layer LY to support the second display substrate BY2.

In some exemplary embodiments, the column spacer CS may include a polymer resin and a pigment or dye dispersed in the polymer resin. The polymeric resin may have a transparent color. For example, the polymer resin may include a polyacrylate resin or a polyimide resin or a polyurethane resin. Although the material of the polymer resin is described, exemplary embodiments are not limited thereto, and the polymer resin may include any suitable material.

The pigment or dye may have any one of orange, yellow, and red colors. For instance, the polymer resin and any one pigment or dye may be mixed to provide a column spacer CS having a specific (or determined) color. In this example, the pigment or dye has been described as having either orange, yellow, or red color, but exemplary embodiments are not limited thereto. For instance, the pigment or dye may be provided in various colors capable of shielding light in a specific wavelength range.

According to some exemplary embodiments, the column spacer CS may shield the first color light output from the light source BLU described with reference to FIG. 1B. The first color light having a blue color may be output from the light source BLU to the display panel DP. The first color light output from the light source BLU may travel in the direction of the second base substrate BS2 through the first base substrate BS1. The first color light incident on the first base substrate BS1 may be provided to the second base substrate BS2 through the liquid crystal layer LY.

Further, a portion of the first color light passing through the liquid crystal layer LY and reaching the in-cell polarizing layer ICL may be reflected toward the first base substrate BS1. As another example, the first color light may be reflected toward the first base substrate BS1 by other factors (or elements) disposed on the second base substrate BS2. In this case, when the first color light reaches the activation layer AL, the activation layer AL may break or cause malfunction. However, according various exemplary embodiments, the column spacer CS covers the activation layer AL and is disposed on the first portion of the first insulation layer IL1 such that the first color light is not transmitted to the activation layer AL. That is, since the column spacer CS has a specific color for absorbing or shielding the first color light, the activation layer AL may be protected from the first color light.

In some exemplary embodiments, the column spacer CS may be higher (or taller) than a first height H1 of the column spacer disposed only in the liquid crystal layer LY. As shown in FIG. 5, the column spacer CS has a second height H2, which is the sum of the first height H1 of the liquid crystal layer LY and the height of the first spacer portion included in the opening OPH. As the thickness of the column spacer CS increases, the efficiency of absorbing or shielding light may be better. Therefore, the first spacer portion of the column spacer CS may have a higher light shielding efficiency than the second spacer portion of the column spacer CS disposed only in the liquid crystal layer LY.

Referring to FIG. 6, the horizontal axis represents the range of the wavelength (nm), and the vertical axis represents the transmittance (%) of light. The blue first color light BO output from the light source (BLU) may have a wavelength range of 400 nm to 500 nm.

A first column spacer CS1 in which the polymer resin and orange pigment are mixed may be longer than the wavelength range of the first color light and may absorb the first color light having a wavelength of 400 nm to 500 nm. That is, the first column spacer CS1 may shield the first color light.

A second column spacer CS2 in which the polymer resin and yellow pigment are mixed may be longer than the wavelength range of the first color light, and may absorb the first color light having a wavelength of 400 nm to 500 nm. That is, the second column spacer CS2 may shield the second color light.

A third column spacer CS3 in which the polymer resin and red pigment are mixed may be longer than the wavelength range of the first color light, and may absorb the first color light having a wavelength of 400 nm to 500 nm. That is, the third column spacer CS3 may shield the first color light.

As described above, the column spacer CS according various exemplary embodiments may maintain the space between the first display substrate BY1 and the second display substrate BY2 and also prevent (or at least reduce) the activation layer AL from being damaged by the first color light.

Although the column spacer CS has been described as being disposed in the non-transmissive area NPA, the column spacer CS according to various exemplary embodiments may be applied to the non-display area NDA adjacent to the display area DA. For instance, the column spacer CS may be disposed on the first base substrate BS1 so as to overlap the non-display area NDA. For example, the structure of the thin film transistor TR and the column spacer CS shown in FIG. 5 may be applied to the structure of a driving transistor and a column spacer arranged in the non-display area NDA. Here, the driving transistor may be included in the gate driving circuit 100.

Figure 7:
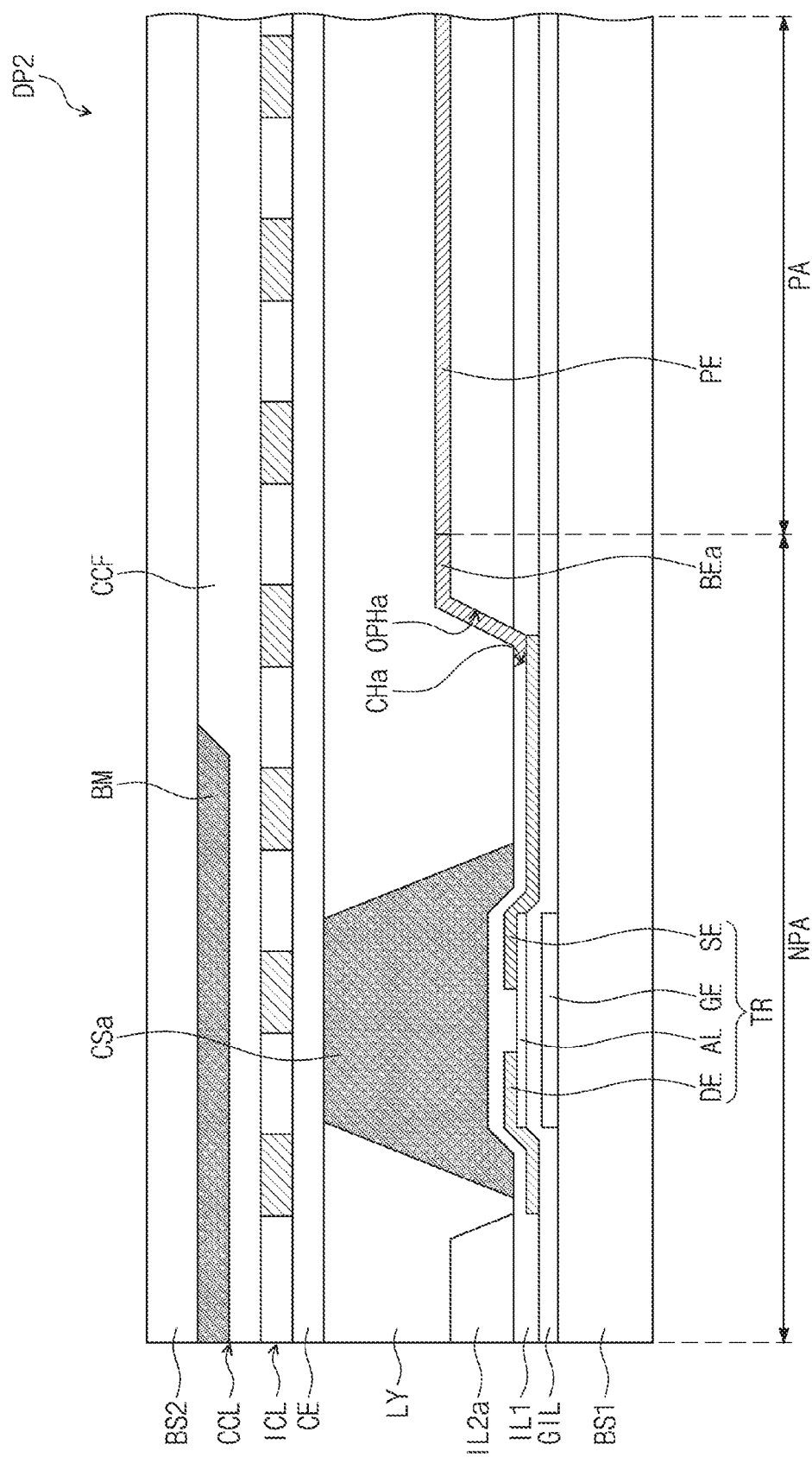
FIG. 7 is a cross-sectional view of a display device according to some exemplary embodiments.

FIG. 7 is a cross-sectional view of a display device according to some exemplary embodiments. The display panel DP2 shown in FIG. 7 is different from the display panel DP shown in FIG. 5 only in that the shape of the opening OPH and the structure of the connection electrode BE are changed, and the structure of the remaining components is substantially the same. Therefore, description of the remaining components is omitted.

Referring to FIG. 7, the second insulation layer IL2a may include an opening OPHa that overlaps the thin film transistor TR as a whole. In this case, the contact hole CH shown in FIG. 5 may be omitted. That is, the connection electrode BEa may be connected to the source electrode SE through the opening OPHa and the contact hole CHa defined in the first insulation layer ILL In this manner, a shape of the column spacer CSa in FIG. 7 may be different than the shape of the column spacer CS in FIG. 5.

An associated manufacturing process of the column spacer CSa shown in FIG. 7 may be easier than an associated manufacturing process of the column spacer CS shown in FIG. 5. For instance, it may be easier to shape the column spacer CSa on the second insulation layer IL2a as the opening OPHa is larger than the opening OPH.

Figure 8:
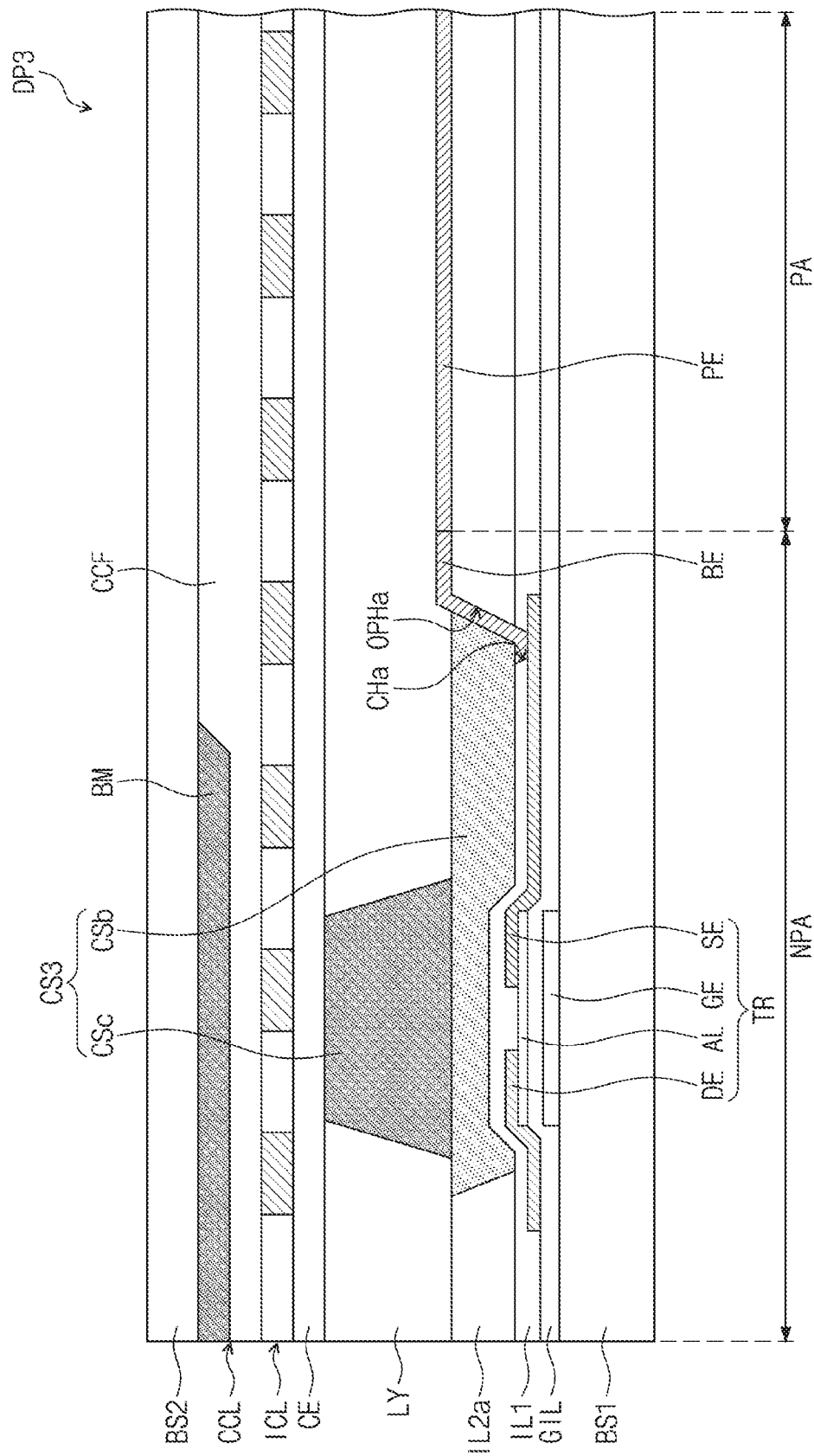
FIG. 8 is a cross-sectional view of a display device according to some exemplary embodiments.

FIG. 8 is a cross-sectional view of a display device according to some exemplary embodiments. Compared with the display panel DP2 shown in FIG. 7, the display panel DP3 shown in FIG. 8 may have only the structure of the column spacer changed, and the structure of the remaining structures may be substantially the same. Therefore, description of the remaining components is omitted.

The column spacer CS3 shown in FIG. 8 is disposed in the opening OPHa and overlaps with the first spacer portion CSb and the activation layer AL (which are flat with the second insulation layer IL2a), and includes a second spacer portion CSc disposed on the first spacer portion CSb.

According to some exemplary embodiments, the first color light incident through the portion of the first base substrate BS1 overlapped with the non-transmissive area NPA may be shielded by the first spacer portion CSb at least because the first spacer portion CSb is entirely filled in the opening OPHa.

In some exemplary embodiments, the first spacer portion CSb may include a polymer resin and a first pigment or a first dye dispersed in the polymer resin. The second spacer portion CSc may include the polymer resin and a second pigment or a second dye dispersed in the polymer resin. The first pigment may have a different color than the second pigment, and the first dye may have a different color than the second dye. Also, the first and second pigments, and the first and second dyes may shield the first color light.

As shown in FIG. 8, the first spacer portion CSb and the second spacer portion CSc are described as including different pigments or dyes, but exemplary embodiments are not limited thereto. That is, the first spacer portion CSb and the second spacer portion CSc may include the same pigment and/or dye.

On the second base substrate BS2, a common electrode CE may be disposed in addition to the conversion layer CCL and the in-cell polarizing layer ICL described with reference to FIG. 1B. The common electrode CE may be supported by the column spacer CS3.

FIGS. 9A to 9F show a display device at various stages of manufacture according to some exemplary embodiments. A method of manufacturing a display device will now be described in association with FIGS. 5 and 9A to 9F.

Referring to FIG. 9A, a thin film transistor TR including a gate electrode GE, a drain electrode DE, a source electrode SE, and an activation layer AL may be formed on a first base substrate BS1. Thereafter, a layer IL1_1 may be formed covering the thin film transistor TR and disposed on the first base substrate BS1. The layer IL1_1 will be formed into the first insulation layer IL1. Thereafter, a layer IL2_1 may be formed on the layer IL1_1. The layer IL2_1 will be formed into the second insulation layer IL2.

Figure 9B:
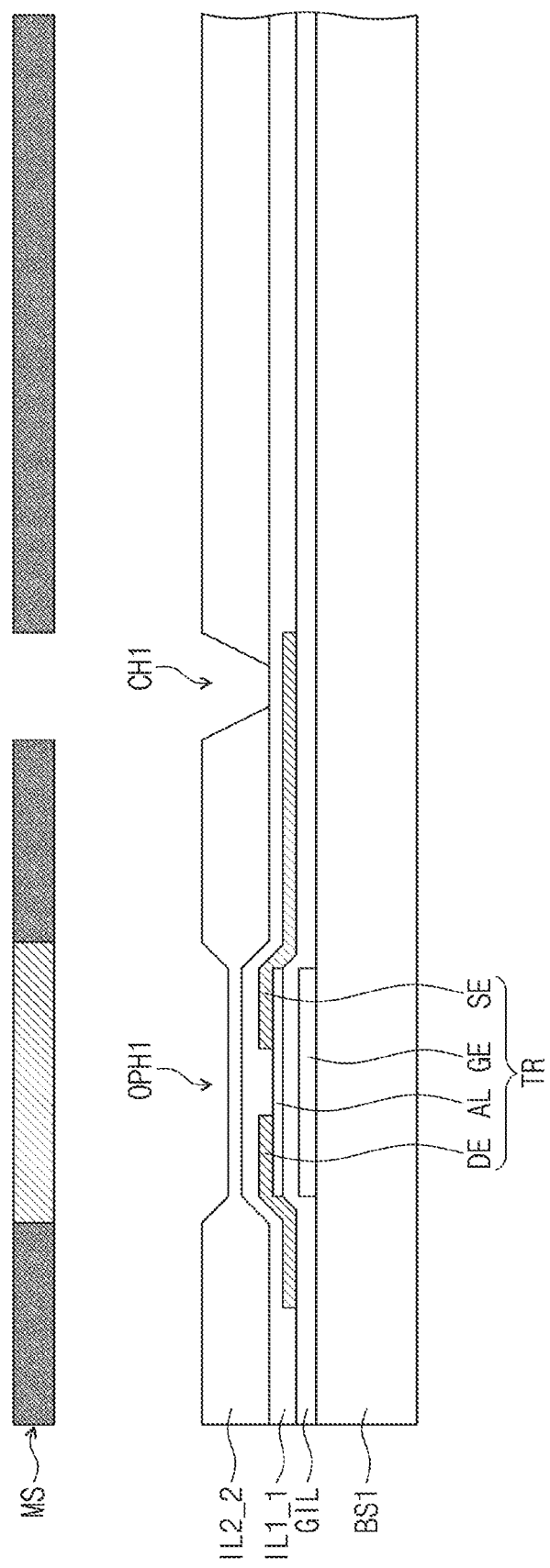

Referring to FIG. 9B, utilizing a mask MS, a first opening OPH1 overlapping the activation layer AL and a first contact hole CH1 may be formed in the layer IL2_1 to thereby form layer IL2_2. For instance, on a plane, the amount of light provided to the layer IL2_1 to form layer IL2_2 through the portion of the mask MS overlapping the first opening OPH1 is less than the amount of light provided to the layer IL2_1 to form layer IL2_2 through the portion of the mask MS overlapping the first contact hole CH1. That is, the portion of the mask MS overlapping the first opening OPH1 may have a certain color, and the portion of the mask MS overlapping the first contact hole CH1 may be opened.

According to various exemplary embodiments, the first opening OPH1 formed in the layer IL2_2 may expose a portion of the layer IL2_2, and the first contact hole CH1 formed in the layer IL2_2 may expose a portion of the layer IL1_1. That is, a portion of the IL2_2 overlapping the activation layer AL may be removed by the light provided through the mask MS, and a portion of the layer IL2_2 overlapping a portion of the source electrode SE may also be removed.

Figure 9C:
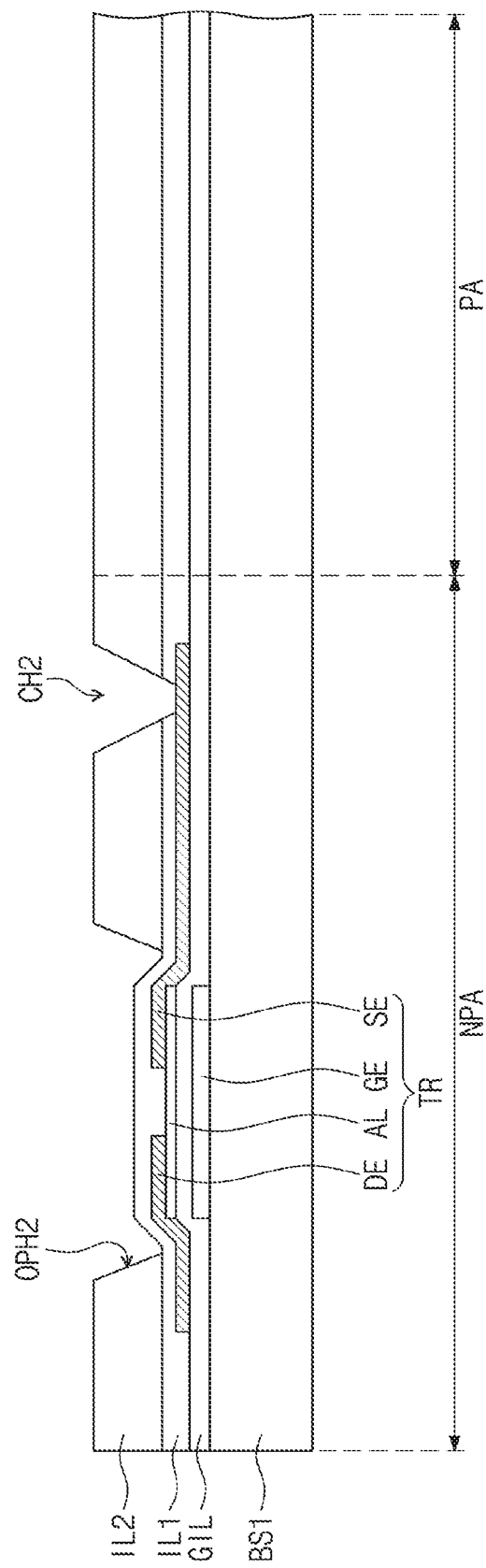

Referring to FIG. 9C, a second opening OPH2 and a second contact hole CH2 may be formed in the first opening OPH1 and the first contact hole CH1 by dry etching. That is, the second opening OPH2 exposes a first portion of the first insulation layer IL1 overlapping the activation layer AL and the second contact hole CH2 exposes a portion of the source electrode SE. In this manner, the first and second insulation layers IL1 and IL2 may be formed.

Figure 9D:
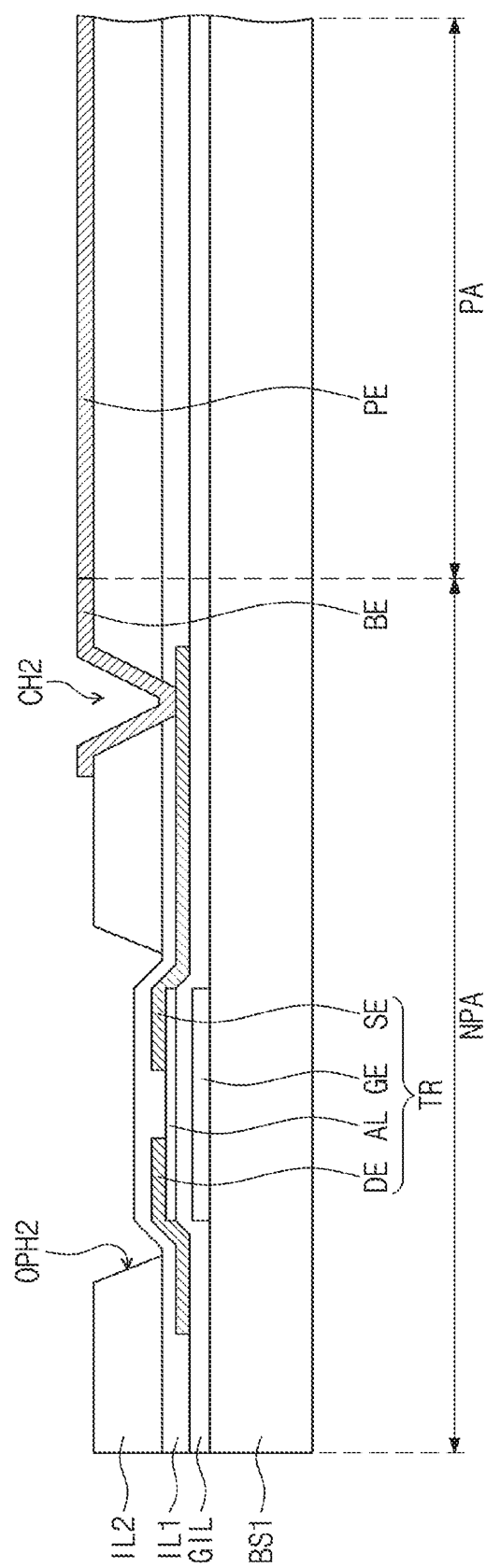

Referring to FIG. 9D, a connection electrode BE and a pixel electrode PE, which is are connected to the source electrode SE, are disposed in the second contact hole CH2.

Figure 9E:
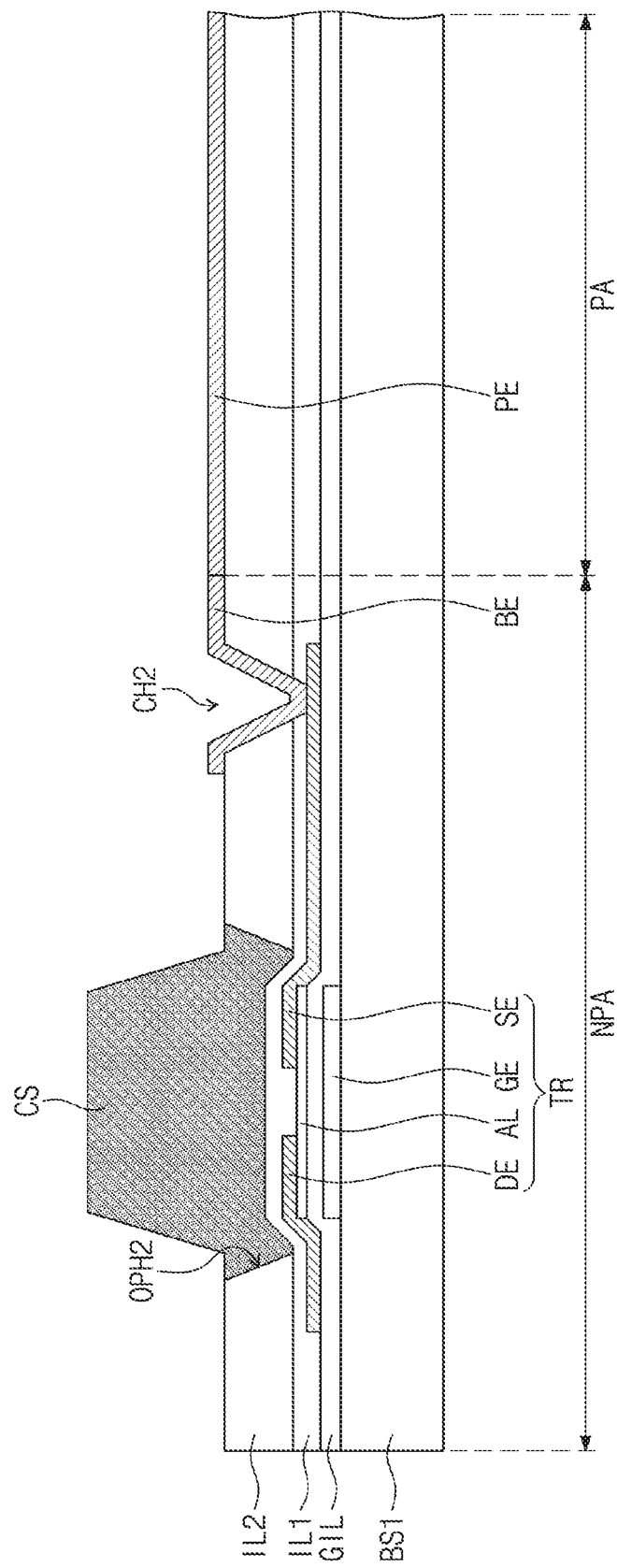

Referring to FIG. 9E, a column spacer CS is formed on the first portion of the first insulation layer IL1 exposed through the second opening OPH2.

Referring to FIG. 9F, a common electrode CE may be formed above the column spacer CS. In this case, the common electrode CE may be supported by the column spacer CS.

Referring to FIG. 5, remaining elements of the second display substrate BY2, such as the in-cell polarization layer ICL, the conversion layer CCL, and the second base substrate BS2, may be formed on the common electrode CE. Thereafter, although not shown in FIGS. 5 and 9F, liquid crystal molecules may be filled in the liquid crystal layer LY. Although described as occurring after formation of the second base substrate BS2, the liquid crystal molecules may be filled in the liquid crystal layer LY at any suitable stage of manufacture.

According to some exemplary embodiments, a column spacer may include a polymer and a pigment or dye of a different color from the first color light output from the light source. For instance, the column spacer may be disposed on a first insulation layer that overlaps an activation layer of a thin film transistor and covers the drain and source electrodes of the thin film transistor. In this manner, the first color light may be prevented (or at least reduced) from being transmitted to the activation layer by the column spacer.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device comprising:
a display panel comprising:
a first display substrate;
a second display substrate facing the first display substrate; and
a column spacer disposed between the first display substrate and the second display substrate;
a light source configured to provide a first color light to the display panel,
wherein the first display substrate comprises:
a first base substrate;
a thin film transistor disposed on the first base substrate, the thin film transistor comprising a gate electrode, a first electrode, a second electrode, and an activation layer;
a first insulation layer covering the thin film transistor and disposed on the first base substrate; and
a second insulation layer disposed on the first insulation layer, the second insulation layer comprising an opening exposing a first portion of an uppermost surface of the first insulation layer overlapping the activation layer,
wherein the second display substrate comprises:
a second base substrate; and
a conversion layer disposed on the second base substrate, the conversion layer being configured to absorb the first color light and emit a second color light, and
wherein:
the column spacer is disposed on the first portion of the uppermost surface of the first insulation layer to cover the activation layer and shield the first color light; and
the first portion of the uppermost surface of first insulation layer overlaps the activation layer.

2. The display device of claim 1, wherein the column spacer comprises:
a polymer resin; and
a pigment or a dye dispersed in the polymer resin, the pigment or the dye being configured to shield the first color light.

3. The display device of claim 2, wherein a color of the pigment or the dye is orange, yellow, or red.

4. The display device of claim 1, wherein the column spacer comprises:
a first spacer portion disposed in the opening and providing a flat, upper surface co-planar with an upper surface of the second insulation layer; and
a second spacer portion extending from the first spacer portion toward a direction of the second display substrate.

5. The display device of claim 1, wherein the first display substrate further comprises:
a connection electrode connected to one electrode among the first electrode and the second electrode of the thin film transistor, the connection electrode being disposed in a contact hole exposing a portion of the one electrode, the contact hole penetrating the first insulation layer and the second insulation layer; and
a pixel electrode disposed on the second insulation layer and connected to the connection electrode.

6. The display device of claim 1, wherein the opening further exposes a second portion of the first insulation layer overlapping the first electrode and the second electrode of the thin film transistor.

7. The display device of claim 6, wherein the column spacer comprises:
a first spacer portion disposed in the opening and providing a flat, upper surface co-planar with an upper-surface of the second insulation layer; and
a second spacer portion overlapping the activation layer and disposed on the first spacer portion.

8. The display device of claim 7, wherein:
the first spacer portion comprises:
a polymer resin; and
a first pigment or a first dye dispersed in the polymer resin, the first pigment or the first dye being configured to shield the first color light;
the second spacer portion comprises:
the polymer resin; and
a second pigment or a second dye dispersed in the polymer resin, the second pigment or the second dye being configured to shield the first color light; and
the first pigment or the first dye has a different color than the second pigment or the second dye.

9. The display device of claim 1, wherein the second display substrate further comprises a common electrode disposed on the conversion layer and supported by the column spacer.

10. The display device of claim 9, wherein the conversion layer comprises:
a first conversion unit comprising a first light emitter configured to absorb the first color light and emit the second color light;
a second conversion unit comprising a second light emitter configured to absorb the first color light and emit a third color light; and
a third conversion unit configured to transmit the first color light.

11. The display device of claim 1, wherein:
the first display substrate further comprises an insulation layer covering the gate electrode and disposed on the first base substrate;
the activation layer overlaps the gate electrode and is disposed on the insulation layer; and
the first electrode and the second electrode of the thin film transistor are spaced apart from each other and contact the activation layer.

12. A display panel comprising:
a first display substrate;
a second display substrate facing the first display substrate, the second display substrate comprising a conversion layer; and
a column spacer disposed between the first display substrate and the second display substrate,
wherein the first display substrate comprises:
a first base substrate;
a thin film transistor disposed on the first base substrate, the thin film transistor comprising a gate electrode, a first electrode, a second electrode, and an activation layer;
a first insulation layer disposed directly on and covering the thin film transistor; and
a second insulation layer disposed on the first insulation layer, the second insulation layer comprising an opening exposing a first portion of the first insulation layer overlapping the activation layer, and wherein:
the column spacer is disposed directly on the first portion to cover the activation layer and to shield a first color light having a determined wavelength range;
the second insulation layer does not overlap the activation layer in a plan view; and
the conversion layer is configured to absorb the first color light and emit a second color light.

13. The display panel of claim 12, wherein the first color light is blue light.

14. The display panel of claim 12, wherein the column spacer comprises:
a polymer resin; and
a pigment or dye dispersed in the polymer resin configured to shield the first color of light.

15. The display panel of claim 12, wherein:
the second display substrate further comprises:
a second base substrate on which the conversion layer is disposed; and
a common electrode disposed on the conversion layer and supported by the column spacer; and
in a thickness direction of the first display substrate, a height of the column spacer is greater than an interval between the second insulation layer and the common electrode.

16. A method of manufacturing a display panel, the method comprising:
forming, on a first base substrate, a thin film transistor comprising a gate electrode, a first electrode, a second electrode, and an activation layer;
forming, on the first base substrate, a first insulation layer directly on and covering the thin film transistor;
forming a second insulation layer on the first insulation layer;
forming an opening in the second insulation layer, the opening exposing a first portion of the first insulation layer overlapping the activation layer;
forming, after forming the opening, a column spacer directly on the first portion covering the activation layer; and
disposing a second base substrate over the first base substrate, the second base substrate being supported by the column spacer and facing the first base substrate;
wherein the column spacer is configured to shield a first color light having a determined wavelength range.

17. The method of claim 16, further comprising:
exposing a second portion of the first insulation layer overlapping the first electrode and the second electrode of the thin film transistor.

18. The method of claim 17, wherein:
forming the column spacer comprises:
forming, in the opening, a first spacer portion such that the first spacer portion forms a flat surface co-planar with a surface of the second insulation layer; and
forming a second spacer portion on the first spacer portion; and
the second spacer portion overlaps the activation layer.

19. The method of claim 16, wherein forming the opening in the second insulation layer comprises:
removing, via a mask, a portion of the second insulation layer overlapping the activation layer; and
removing, via dry etching, a remaining portion of the second insulation layer overlapping the activation layer to expose the first portion of the first insulation layer.

20. The method of claim 16, wherein the column spacer is formed by mixing a polymer resin and a pigment or dye of a different color than the first color.

* * * * *